United States Patent [19]

Kosha et al.

[11] Patent Number: 4,759,979
[45] Date of Patent: Jul. 26, 1988

[54] MAGNETIC RECORDING MEDIUM
[75] Inventors: Hideaki Kosha; Kiyomi Ejiri, both of Kanagawa, Japan
[73] Assignee: Fuji Photo Film Co., Ltd., Kanagawa, Japan
[21] Appl. No.: 927,464
[22] Filed: Nov. 6, 1986
[30] Foreign Application Priority Data Nov. 6, 1985 [JP] Japan ................... 60-247219

[51] Int. Cl.$^4$ ............................................. G11B 5/708
[52] U.S. Cl. ................................ 428/323; 427/128; 428/328; 428/329; 428/694; 428/900
[58] Field of Search ............... 428/323, 328, 329, 694, 428/900; 427/128; 252/62.54

[56] References Cited

U.S. PATENT DOCUMENTS

| | | | |
|---|---|---|---|
| 4,275,115 | 6/1981 | Naruse | 428/694 |
| 4,328,935 | 5/1982 | Steel | 428/900 |
| 4,388,369 | 6/1983 | Tamai et al. | 428/900 |
| 4,399,189 | 8/1983 | Nakashima et al. | 427/128 |
| 4,425,400 | 1/1984 | Yamaguchi et al. | 428/900 |
| 4,455,345 | 6/1984 | Miyataka et al. | 428/695 |
| 4,571,362 | 2/1986 | Sato et al. | 428/900 |
| 4,595,631 | 6/1986 | Matsumoto | 428/694 |
| 4,609,588 | 9/1986 | Hosaka et al. | 428/694 |
| 4,618,536 | 10/1986 | Morioka et al. | 428/323 |
| 4,668,568 | 5/1987 | Fujiyama et al. | 428/694 |

Primary Examiner—Paul J. Thibodeau
Attorney, Agent, or Firm—Sughrue, Mion, Zinn, Macpeak, and Seas

[57] ABSTRACT

A magnetic recording medium is disclosed which comprises a non-magnetic support having coated thereon a magnetic layer containing a specific amount of a specific acicular $Cr_2O_3$ along with alpha-$Al_2O_3$, SiC, and/or TiC, which medium shows excellent surface properties and electromagnetic properties, as well as improved running durability.

10 Claims, No Drawings

MAGNETIC RECORDING MEDIUM

FIELD OF THE INVENTION

This invention relates to a magnetic recording medium with a magnetic layer coated on a non-magnetic support, especially to a magnetic recording medium whose running durability has been improved.

BACKGROUND OF THE INVENTION

Heretofore, as tape or disk magnetic recording media for use in audio, video, computer, etc., equipment, use has been made of magnetic recording media which has been prepared by coating on a non-magnetic support a magnetic layer comprising a ferromagnetic powder such as gamma-$Fe_2O_3$, Co-containing iron oxide, chromium dioxide, ferromagnetic alloy powder, etc., dispersed in a binder. Recently, with such magnetic recording media becoming higher and higher in its density and S/N ratio, there has developed a practice of comminuting the magnetic material, but as this comminution inevitably reduces the abrasiveness of the magnetic material, the magnetic recording media using such a magnetic material deteriorates in running durability. The tendency is more remarkable in use of a ferromagnetic alloy powder having a low hardness.

As a contermeasure for preventing such deterioration in running durability, it has hitherto been proposed to add to the magnetic layer an abrasive such as granular $Al_2O_3$, SiC, $Cr_2O_3$, etc., as described, for example, in U.S. Pat. No. 4,285,825. When such an abrasive is added in a large amount, however, the magnetic recording medium has defects in magnetic orientation as well as in packing degree and dispersibility of the magnetic powder, and in turn deterioration of the surface property. As a result, electromagnetic properties degrade due to the deterioration of the surface property.

Although the electromagnetic properties can be improved if the amount of the abrasive added is reduced so as not to deteriorate the surface property, increase found in friction coefficient of the magnetic layer causes sticking during running, and thus problems arise in that running property of the magnetic recording medium is damaged.

One of the present inventors with another previously found that the above-described defects can be eliminated by a method wherein, as the abrasive, use is made of an acicular inorganic material which is not more than 1.0 micron ($\mu$m) in length (the length of the long-axis thereof) and not more than 0.1 micron in width (the length of the short-axis thereof), having an acicular ratio of from 5/1 to 20/1 and a Moh's hardness of 5 or higher, as described in Japanese patent application No. 62938/85 corresponding to U.S. Pat. Ser. No. 843,973 filed Mar. 25, 1986.

SUMMARY OF THE INVENTION

An object of this invention is to provide a magnetic recording medium having both excellent running durability and electromagnetic properties.

As a result of extensive studies to obtain a magnetic recording medium having further improved running properties, it has now been found that both the running durability and the electromagnetic properties of the magnetic layer can be remarkably improved by incorporating a specific acicular $Cr_2O_3$ into the magnetic layer along with a specific inorganic powder, i.e., at least one member selected from the group consisting of alpha-$Al_2O_3$, SiC, and TiC, in a specific ratio and in a specific amount, and thus this invention has been achieved.

That is, according to the present invention there is provided a magnetic recording medium comprising a non-magnetic support having coated thereon a magnetic layer containing ferromagnetic powder dispersed in a binder, wherein the magnetic layer further contains acicular $Cr_2O_3$ particles which are not more than 1.0 micron in length and not more than 0.1 micron in width, with an acicular ratio of from 5/1 to 20/1, along with at least one inorganic powder selected from the group consisting of alpha-$Al_2O_3$, SiC, and TiC, with the weight ratio of the acicular $Cr_2O_3$ particle to the inorganic powder being not less than 2/8, the total amount of the acicular $Cr_2O_3$ and the inorganic powder being from 1 to 20 wt % (% by weight) based on the weight of the ferromagnetic powder.

DETAILED DESCRIPTION OF THE INVENTION

This invention is applicable also to magnetic recording media using ferromagnetic powder of iron oxide system, Co-containing iron oxide system, or chromium dioxide ($CrO_2$) system, that are heretofore in general use, but it is particularly useful in the case where use is made of so-called ferromagnetic alloy powder, especially ferromagnetic alloy powder whose specific surface area is 25 $m^2/g$ or more. Namely, although it is found that such ferromagnetic alloy powder is low in hardness as compared with the other ferromagnetic powders, and hence a magnetic recording medium using this powder is low in abrasiveness, the running durability showing a marked tendency to become poor, in accordance with this invention all these problems can be solved effectively.

As to the non-magnetic support used in this invention, there is no particular limitation, so that use can be made of any support in common use. Examples of materials forming a non-magnetic support include various kinds of synthetic resin films such as polyethylene terephthalate (PET), polypropylene, polycarbonate, polyethylene naphthalate, polyamide, polyamideimide, polyimide, etc., and metal foils such as aluminum foil, stainless steel foil, etc. The thickness of the non-magnetic support is also not particularly limitative, and it is generally from 3 to 50 microns, and preferably from 5 to 30 microns.

The non-magnetic support may have a back layer (backing layer) on the side thereof which is not provided with a magnetic layer as described hereafter.

The magnetic recording medium of this invention is a recording medium provided with a magnetic layer containing ferromagnetic powder dispersed in a binder on a non-magnetic support as described above.

Example of the ferromagnetic powders usable in the magnetic layer of this invention include ferromagnetic alloy powders containing iron as the chief ingredient, gamma-$Fe_2O_3$, $Fe_3O_4$, C-modified ferromagnetic iron oxide, $CrO_2$, modified barium ferrite, modified strontium ferrite, etc., but this invention is especially effective in the case wherein, as the ferromagnetic powder, use is made of a ferromagnetic alloy powder which contains at least one or iron, cobalt, and nickel, and further has a specific surface area of 25 $m^2/g$ or more.

The above-described ferromagnetic alloy powder is one which contains about 75 wt % or more metal component, with about 80 wt % or more of the metal component being at least one ferromagnetic metal (i.e., Fe, Co, Ni, Fe-Co, Fe-Ni, Co-Ni, or Co-Ni-Fe) and about 20 wt % or less, preferably from 0.5 to 5 wt %, of the metal component being Al, Si, S, Sc, Ti, V, Cr, Mn, Cu, Zn, Y, Mo, Rh, Pd, Ag, Sn, Sb, Te, Ba, Ta, W, Re, Au, Hg, Pb, Bi, La, Ce, Pr, Nd, B, P, etc. In some cases, the ferromagnetic alloy contains a slight amount of water, hydroxides, or oxides. The method of preparation of these ferromagnetic metal powders including ferromagnetic alloy powder, which is the typical example of the magnetic powder used in this invention, is well known as described, for example, in U.S. Pat. Nos. 3,902,888, 4,165,748, and 3,923,293.

When using a ferromagnetic alloy powder, there is no particular limitation to its form, but usually those having the form of needles, granules, cubes, rice grains, plates, etc. are used. The specific surface area (S BET) of the ferromagnetic alloy powder is more preferably 42 $m^2/g$ or more, and most preferably 45 $m^2/g$ or more.

As the binder used for the formation of the magnetic layer of this invention, use can be made of thermoplastic resins, thermosetting resins, and reaction-sensitive resins that are in common use. These resins may be used either singly or in admixture.

Examples of the thermoplastic resin include those which have an average molecular weight of from 10,000 to 200,000 and a degree of polymerization of from about 200 to 2,000, such as vinyl chloride/vinyl acetate copolymer resin, vinyl chloride/vinylidene chloride copolymer, acryl resins, cellulose derivatives, thermoplastic resins of various synthetic rubber systems, urethane elastomer, polyvinyl fluoride, polyamide resins, polyvinyl butyrate, styrene/butadiene copolymer, polystyrene resins, etc. They may be used either singly or in an admixture.

Examples of the thermosetting or reaction-sensitive resin include those which have an average molecular weight less than 200,000 in the state of a coating liquid though the molecular weight becomes almost infinite through condensation and addition reaction after coating, and those, which do not soften or melt by heat in the course leading to hardening are preferred. More specifically, examples which can be used include phenol/formalin novolak resin, phenol/formalin resol resin, phenol/furfural resin, xylene/formaldehyde resin, urea resin, melamine resin, drying oil-modified alkyd resin, phenol resin-modified alkyd resin, maleic acid-modified alkyd resin, unsaturated polyester resin, combination of epoxy resin and hardener, terminal-isocyanate polyether resin of moisture-setting type, polyisocyanate prepolymer, combination of polyisocyanate prepolymer and active hydrogen-containing resin, etc. They may be used either singly or in combination.

The amount of the binder used is generally in the range of from 10 to 100 parts by weight, and preferably from 15 to 50 parts by weight per 100 parts by weight of the ferromagnetic powder.

This invention is characterized in that the magnetic layer contains alpha-$Al_2O_3$, SiC, and/or TiC in addition to the specific acicular $Cr_2O_3$.

The $Cr_2O_3$ used in this invention is acicular $Cr_2O_3$ which is not more than 1.0 micron, preferably from 0.1 to 0.95 micron in length, and not more than 0.1 micron, preferably from 0.02 to 0.09 micron in width, and having an acicular ratio of from 5/1 to 20/1, preferably from 8/1 to 15/1.

In the case where the $Cr_2O_3$ used as the abrasive has a length of more than 1.0 micron and a width of more than 0.1 micron with the acicular ratio being smaller than 5/1 or larger than 20/1, not only does the dispersibility of the $Cr_2O_3$ decrease, but also the electromagnetic properties cannot be improved satisfactorily. Furthermore, sometimes it may exert an adverse influence upon the magnetic orientation or fail to improve the electromagnetic properties of the magnetic recording medium thus obtained.

In addition, the upper limits of the length and width as defined in this invention mean the upper limits of the respective average values of the length and width of the $Cr_2O_3$ contained in the magnetic layer. The numerical values of the respective preferable ranges also have the same meanings.

The above-described $Cr_2O_3$ used in this invention has a hardness of about 9 on the Mohs scale.

The acicular $Cr_2O_3$ used in this invention can be prepared by a conventional method such as, for example, the following: a mixture of $CrO_3$ and $Cr_2O_3$ is dispersed in water to give an aqueous slurry, which is subjected to hydrothermal reaction at a temperature of from 350° to 370° C., under a pressure in the range of from 300 to 500 atmospheres in an autoclave, and the resulting acicular $CrO_2$ is further heated at a temperature of from 700° to 900° C., preferably from 800° to 850° C., in air to provide acicular $Cr_2O_3$. Alternatively, the $Cr_2(CrO_4)_3$ which can be obtained by the partial reduction of $CrO_3$ may be used as the starting material.

In this invention, the magnetic layer contains the above-described acicular $Cr_2O_3$ along with at least one inorganic powder selected from the group consisting of alpha-$Al_2O_3$, SiC, and TiC under the conditions such that the weight ratio of the acicular $Cr_2O_3$/inorganic powder is not less than 2/8, preferably from 3/7 to 9/1, and the total amount of the acicular $Cr_2O_3$ and the inorganic powder is from 1 to 20 wt % of the ferromagnetic powder.

When the magnetic layer contains the acicular $Cr_2O_3$ along with the inorganic powder under the above-described conditions, one can obtain a magnetic recording medium which has excellent running durability and electromagnetic properties, and especially has excellent still durability in the case where it is used as a magnetic recording tape, etc., for video. That is to say, although the inorganic powder used in this invention has no abrasive power in itself, when it is used in combination with the acicular $Cr_2O_3$ having excellent abrasive power, in the above-described range, the still durability can be particularly improved.

To the particle size of alpha-$Al_2O_3$, SiC, and TiC that are the inorganic powder used in this invention there is no particular limitation, but it is preferably from 0.1 to 5 microns, and these powders can be prepared by a conventional method and are also commercially available.

Since the magnetic recording medium of this invention contains the above-described acicular $Cr_2O_3$ in the magnetic layer, there is no need for adding any other abrasive at all, but any other abrasive which is in common use can be added so long as the object of this invention is achieved without hindrance.

Similarly, so long as the object of this invention can be achieved without hindrance, any other granular additive which is in common use (for example, as an antistatic agent, carbon black having an average particle diameter of from 0.015 to 0.2 micron) can be added.

In preparation of the magnetic layer of the magnetic recording medium of this invention, the above-described acicular $Cr_2O_3$ and inorganic powder are first kneaded in a solvent together with ferromagnetic powder such as ferromagnetic alloy powder, etc. and binder, and if desired, any other granular filling material, to give a magnetic paint, which is coated on a support, and then, subjected to magnetic orientation followed by drying.

The solvent used in the kneading may be such a solvent as commonly used in preparation of magnetic paints, as described in U.S. Pat. No. 4,135,016.

As the preparation technique of magnetic paints (including a kneading methods, addition order of the components), various techniques are known, and in preparation of the magnetic recording medium of this invention, various known techniques as described, for example, in U.S. Pat. No. 4,135,016 can be employed.

In preparation of magnetic paints, known additives such as dispersants, antistatic agents, lubricants, etc., can be used in combination.

Examples of useful dispersants include conventional dispersants such as fatty acids of from 12 to 18 carbon atoms, metallic soaps composed of the fatty acids and alkali metals or alkaline earth metals, esters of the fatty acids and derivatives thereof, whose hydrogen has been partially or wholly replaced with fluorine, amides of the fatty acids, aliphatic amines, higher alcohols, alkylphosphoric esters of polyalkylene oxide, alkylphosphoric esters, alkylboric esters, sarcosinates, alkylether esters, trialkylpolyolefinoxy-quaternaryammonium salt, lecithin, etc. When a dispersant is added, it is usually used in an amount ranging from 0.5 to 2.0 parts by weight per 100 parts by weight of the binder.

Examples of useful antistatic agents include natural surfactants; nonionic surfactants; cationic surfactants; anionic surfactants containing an acid group such as carboxylic acid, sulfonic acid, phosphoric acid, sulfuric ester, phosphoric ester, etc.; ampholytic surfactants such as amino acids, aminosulfonic acids, sulfuric or phosphoric esters of aminoalcohols, etc. When a conductive fine powder such as carbon black is used as the antistatic agent, it is used, for instance, in an amount ranging from 0.2 to 20 parts by weight per 100 parts by weight of the binder, and when a surfactant is used, it is used in the range of from 0.1 to 10 parts by weight per 100 parts by weight of the binder.

Examples of useful lubricants include the above-described fatty acids, higher alcohols, fatty acid esters such as butyl stearate, sorbitan oleate, etc., which are composed of a monobasic fatty acid having from 12 to 20 carbon atoms and monohydric or polyhydric alcohol having from 3 to 20 carbon atoms; mineral oils, animal and vegetable fats and oils, oligomers of olefin (e.g., alpha-olefin), and graphite fine powder, etc., as well as lubricants used for plastics. The amount of the lubricant added may be determined optionally in a conventional manner.

In addition, it should be understood that the above-described additives such as dispersant, antistatic agent, lubricant, etc., have not been described under any limitation that they have only the working effects as described above. Thus, it may be that a dispersant also acts as a lubricant or as an antistatic agent, and the amount of an additive having such a plurality of working effects should preferably be determined taking its all working effects into consideration.

The magnetic paint prepared in such a way is coated on the above-described non-magnetic support in a conventional manner, as described in U.S. Pat. No. 4,135,016. The coating is usually carried out directly on the above-described non-magnetic support, but it is also possible to coat the paint on an adhesive layer formed on the non-magnetic support.

The thickness of the magnetic layer coated in this way is not critical, but it is generally in the range of from about 0.5 to 10 microns, and usually from 1.5 to 7.0 microns, in thickness after drying.

The magnetic layer coated on the non-magnetic support is usually subjected to a treatment for allowing the ferromagnetic powder in the magnetic layer to orient, i.e., magnetic orientation, and thereafter dried. Also, if desired, it is subjected to a surface smoothing treatment. The magnetic recording medium subjected to the surface smoothing treatment is then cut into the desired shaped. These treatments are well known as described in U.S. Pat. 4,135,016.

Next, examples and comparative examples of this invention are described. The term "part(s)" in these examples and comparative examples means "part(s) by weight."

EXAMPLE 1

A slurry which was obtained by dispersing a mixture of $CrO_3$ and $Cr_2O_3$ (weight ratio: 1/1) in water was subjected to hydrothermal reaction (reaction time: 5 hours) at a temperature of 350° C. and a pressure of 300 atmospheres to provide acicular $CrO_2$ which was then heated at 800° C. for 2 hours in air to obtain acicular $Cr_2O_3$.

The acicular $Cr_2O_3$ thus obtained was classified before use.

Then, a magnetic paint was prepared having the following composition, and it was coated on a polyethylene terephthalate film having a thickness of 10 microns to form a magnetic layer having a dry thickness of 3.0 microns.

| Composition of magnetic paint | |
|---|---|
| Ferromagnetic alloy powder (Fe—Ni alloy; Ni about 5 wt %; and specific surface area (S-BET) 45 $m^2/g$) | 100 parts |
| Vinyl chloride/vinyl acetate/maleic anhydride copolymer (manufactured by Nippon Zeon Co.: "400 × 110 A") | 12 parts |
| Polyurethane resin (manufactured by Nippon Polyurethane Co.: "N-2301") | 8 parts |
| Polyisocyanate (manufactured by Nippon Polyurethane Co.: "Coronate L") | 12 parts |
| Carbon black (average particle size 0.1 micron) | 1 part |
| Methyl ethyl ketone | 300 parts |
| Acicular $Cr_2O_3$ (length 0.3 micron; width 0.03 micron; and acicular ratio 10) | 3 parts |
| Granular alpha-$Al_2O_3$ (average particle size 0.2 micron) | 2 parts |

The magnetic paint-coated film was subjected to magnetic orientation while the magnetic paint was still in the undried state, and after drying it was subjected to calender treatment and then slit into 8 mm width to prepare an 8 mm video tape.

EXAMPLE 2

A video tape was prepared in the same manner as in Example 1, except that the amounts of acicular $Cr_2O_3$ and alpha-Al$_2$O$_3$ added were changed to 2 parts and 3 parts, respectively.

EXAMPLE 3

A video tape was prepared in the same manner as in Example 1, except that the amounts of acicular Cr$_2$O$_3$ and alpha-Al$_2$O$_3$ added were changed to 1.5 parts and 3.5 parts, respectively.

EXAMPLE 4

A video tape was prepared in the same manner as in Example 1, except that the alpha-Al$_2$O$_3$ was replaced by TiC (average particle size 0.2 micron).

EXAMPLE 5

A video tape was prepared in the same manner as in Example 1, except that the alpha-Al$_2$O$_3$ was replaced by SiC (average particle size 0.2 micron).

EXAMPLE 6

A video tape was prepared in the same manner as in Example 1, except that the Cr$_2$O$_3$ was replaced by another Cr$_2$O$_3$ which had a 0.9 micron in length and 0.07 micron in width (acicular ratio 12.9/1).

COMPARATIVE EXAMPLE 1

A video tape was prepared in the same manner as in Example 1, except that the alpha-Al$_2$O$_3$ was not added and the amount of acicular Cr$_2$O$_3$ added was changed to 5 parts.

COMPARATIVE EXAMPLE 2

A video tape was prepared in the same manner as in Example 1, except that 5 parts of granular Cr$_2$O$_3$ (size 0.3 micron) was used in place of the acicular Cr$_2$O$_3$ and alpha-Al$_2$O$_3$.

COMPARATIVE EXAMPLE 3

A video tape was prepared in the same manner as in Example 1, except that 5 parts of granular alpha-Al$_2$O$_3$ (size 0.3 micron) was used in place of the acicular Cr$_2$O$_3$ and alpha-Al$_2$O$_3$.

COMPARATIVE EXAMPLE 4

A video tape was prepared in the same manner as in Example 1, except that 5 parts of granular TiC (size 0.3 micron) was used in place of the acicular Cr$_2$O$_3$ and alpha-Al$_2$O$_3$.

COMPARATIVE EXAMPLE 5

A video tape was prepared in the same manner as in Example 1, except that 5 parts of granular SiC (size 0.3 micron) was used in place of the acicular Cr$_2$O$_3$ and alpha-Al$_2$O$_3$.

COMPARATIVE EXAMPLE 6

A video tape was prepared in the same manner as in Example 1, except that the alpha-Al$_2$O$_3$ was not added and 15 parts of the acicular Cr$_2$O$_3$ was added.

COMPARATIVE EXAMPLE 7

A video tape was prepared in the same manner as in Example 1, except that Cr$_2$O$_3$ of 0.08 micron in length and 0.02 micron in width (acicular ratio 4/1) was used in place of the acicular Cr$_2$O$_3$.

COMPARATIVE EXAMPLE 8

A video tape was prepared in the same manner as in Example 1, except that the Cr$_2$O$_3$ was replaced by another Cr$_2$O$_3$ of 1.2 microns in length and 0.06 micron in width (acicular ratio 20/1).

Electromagnetic properties and running durability of the above-described samples were measured, and the results are shown in the following Table, in which "E" and "C" are abbreviations of EXAMPLE and COMPARATIVE EXAMPLE, respectively.

TABLE

| Ex. or Comp. Ex. | Br[*1] (G) | Br/Bm[*1] | Surface[*2] Gloss (%) | Video[*3] Output (dB) | C/N[*3] (dB) | Output[*3] After 100 Passes (dB) | Output[*3] After 200 Passes (dB) | Still[*4] Durability (min) | Head[*5] Clogging |
|---|---|---|---|---|---|---|---|---|---|
| E1 | 2880 | 0.83 | 118 | +3.5 | +3.6 | −0.5 | −0.7 | 150 | more than 200 |
| E2 | 2830 | 0.82 | 116 | +3.3 | +3.4 | −1.0 | −1.3 | 145 | more than 200 |
| E3 | 2800 | 0.81 | 115 | +3.8 | +3.0 | −0.8 | −1.0 | 120 | more than 200 |
| E4 | 2840 | 0.82 | 117 | +3.5 | +3.4 | −0.5 | −0.6 | 140 | more than 200 |
| E5 | 2830 | 0.82 | 116 | +3.4 | +3.3 | −0.4 | −0.6 | 145 | more than 200 |
| E6 | 2800 | 0.83 | 120 | +3.4 | +3.5 | −0.4 | −0.7 | 150 | more than 200 |
| C1 | 2900 | 0.83 | 120 | +3.5 | +3.7 | −1.5 | −2.0 | 60 | more than 200 |
| C2 | 2620 | 0.79 | 100 | 0 | 0 | −6.0 | too low to measure | 25 | 100 |
| C3 | 2710 | 0.80 | 106 | +1.5 | +0.5 | −5.0 | too low to measure | 35 | 110 |
| C4 | 2680 | 0.79 | 95 | −0.2 | −0.7 | −4.5 | too low to measure | 40 | 105 |
| C5 | 2660 | 0.79 | 93 | −0.4 | −0.7 | −5.5 | too low to measure | 30 | 100 |
| C6 | 2780 | 0.82 | 115 | +3.1 | +3.1 | −1.0 | −1.4 | 90 | more than 200 |
| C7 | 2810 | 0.80 | 125 | +3.2 | +2.2 | −2.3 | −2.9 | 45 | 120 |
| C8 | 2680 | 0.82 | 107 | +1.6 | +1.5 | −0.3 | −0.7 | 100 | more than |

TABLE-continued

| Ex. or Comp. Ex. | Br*1 (G) | Br/Bm*1 | Surface*2 Gloss (%) | Video*3 Output (dB) | C/N*3 (dB) | Output*3 After 100 Passes (dB) | After 200 Passes (dB) | Still*4 Durability (min) | Head*5 Clogging |
|---|---|---|---|---|---|---|---|---|---|
| | | | | | | | | | 200 |

[Note]
*1 As the magnetic characteristic of the video tape a B-H curve (B: magnetic flux density; H: external magnetic field) was obtained by measurement, from which the squareness ratio (Br/Bm) (Br: maximum residual magnetic flux density, Bm: maximum magnetic flux density) was calculated.
*2 The surface gloss of the video tape was measured in terms of total reflectivity at an incident angle of 45° and at a reflection angle of 45° using a digital standard color-difference photometer "AUD-CH-GV3" manufactured by Suga Testing Machine Co. and calculated as a relative value, taking the surface gloss of a glass having a refractive index of 1.567 at an incident angle of 45° as being 100, in accordance with JIS Z8741.
*3 Using an 8 mm video recorder "FUJIX-8" manufactured by Fuji Photo Film Co., Ltd., output signal of 5 MHz signal and C/N of 4 MHz signal were measured and calculated as relative values, based on those of the video tape obtained in Comparative Example 2 taken as being 0 dB, respectively. Further, output signals after 100 passes and after 200 passes were measured, respectively, and calculated as relative values based on that of the 5 MHz signal just after recording on the video tape obtained in Comparative Example 2 taken as being 0 dB.
*4 Using the above-described video recorder, recorded signal was reproduced in still mode, and the time required until the output signal becomes two thirds of that of the recorded signal (still life) was measured.
*5 Using the above-described video recorder, the video tape was repeatedly run at half the ordinary running velocity and the number of runs of the tape until head-clogging occurs was measured.

It is clearly seen from the above results that a magnetic recording medium of the present invention comprising a non-magnetic support having coated thereon a magnetic layer containing a specific amount of a specific acicular $Cr_2O_3$ along with alpha-$Al_2O_3$, SiC, and/or TiC shows excellent surface property and electromagnetic properties as well as improved running durability.

While the invention has been described in detail and with reference to specific embodiments thereof, it will be apparent to one skilled in the art that various changes and modifications can be made therein without departing from the spirit and scope thereof.

What is claimed is:

1. A magnetic recording medium comprising a non-magnetic support having coated thereon a magnetic layer containing ferromagnetic powder dispersed in a binder, wherein said magnetic layer contains acicular $Cr_2O_3$ particles which are not more than 1.0 micron in the length of the long-axis and not more than 0.1 micron in the length of the short-axis, has an acicular ratio of from 5/1 to 20/1, along with at least one inorganic powder selected from the group consisting of alpha-$Al_2O_3$, SiC, and TiC, with the weight ratio of said acicular $Cr_2O_3$/inorganic powder being not less than 2/8, and the total amount of said acicular $Cr_2O_3$ and inorganic powder being from 1 to 20% by weight based on the weight of said ferromagnetic powder.

2. A magnetic recording medium as in claim 1, wherein said ferromagnetic powder is a ferromagnetic alloy powder.

3. A magnetic recording medium as in claim 1, wherein said inorganic powder is alpha-$Al_2O_3$.

4. A magnetic recording medium as in claim 1, wherein said inorganic powder is SiC.

5. A magnetic recording medium as in claim 1, wherein said inorganic powder is TiC.

6. A magnetic recording medium as in claim 2, wherein said ferromagnetic alloy powder contains at least one of iron, cobalt, or nickel, and has a specific surface area of 25 $m^2$/g or more.

7. A magnetic recording medium as in claim 6, wherein the specific surface area of the ferromagnetic alloy powder is 42 $m^2$/g or more.

8. A magnetic recording medium as in claim 6, wherein the specific surface area of the ferromagnetic alloy powder is 45 $m^2$/g or more.

9. A magnetic recording medium as in claim 1, wherein the acicular $Cr_2O_3$ particles are from 0.1 to 0.95 micron in the length of the long-axis and from 0.02 to 0.09 micron in the length of the short-axis, and have an acicular ratio of from 8/1 to 15/1.

10. A magnetic recording medium as in claim 1, wherein the weight ratio of acicular $Cr_2O_3$/inorganic powder is from 3/7 to 9/1.

* * * * *